United States Patent
Naruse et al.

(10) Patent No.: US 9,785,863 B2
(45) Date of Patent: Oct. 10, 2017

(54) FINGERPRINT AUTHENTICATION

(71) Applicant: Sony Mobile Communications Inc., Tokyo (JP)

(72) Inventors: Tetsuya Naruse, Tokyo (JP); Myungjin Jung, Tokyo (JP)

(73) Assignee: Sony Mobile Communications Inc., Tokyo (JP)

(*) Notice: Subject to any disclaimer, the term of this patent is extended or adjusted under 35 U.S.C. 154(b) by 216 days.

(21) Appl. No.: 14/842,656

(22) Filed: Sep. 1, 2015

(65) Prior Publication Data

US 2017/0061191 A1   Mar. 2, 2017

(51) Int. Cl.
*G06K 9/00* (2006.01)
*G06K 9/46* (2006.01)
*G06K 9/62* (2006.01)

(52) U.S. Cl.
CPC ........ *G06K 9/6203* (2013.01); *G06K 9/001* (2013.01)

(58) Field of Classification Search
CPC ....... G06K 2009/4666; G06K 9/00013; G06K 9/00067; G06K 9/00087; G06K 9/001; G06K 9/46; G06K 9/6203
See application file for complete search history.

(56) References Cited

U.S. PATENT DOCUMENTS

2002/0150282 A1* 10/2002 Kinsella ............. G06K 9/00013
382/124

FOREIGN PATENT DOCUMENTS

JP   2007-264958   10/2007

* cited by examiner

*Primary Examiner* — Andy Rao
*Assistant Examiner* — Tyler Edwards
(74) *Attorney, Agent, or Firm* — Oblon, McClelland, Maier & Neustadt, L.L.P.

(57) ABSTRACT

Systems and methods of an electronic device include an imaging device and a button. The electronic device also has circuitry configured to acquire a first fingerprint image captured by the imaging device in which the button is not engaged; extract first fingerprint features from the first fingerprint image; store the first fingerprint features as a registered fingerprint image; acquire a second fingerprint image captured by the imaging device in which the button is engaged; extract second fingerprint features from the second fingerprint image; compare the first fingerprint features of the registered fingerprint image and the second fingerprint features extracted from the second fingerprint image; and calculate and store an amount of distortion of the second fingerprint image based on a result of the comparing.

16 Claims, 12 Drawing Sheets

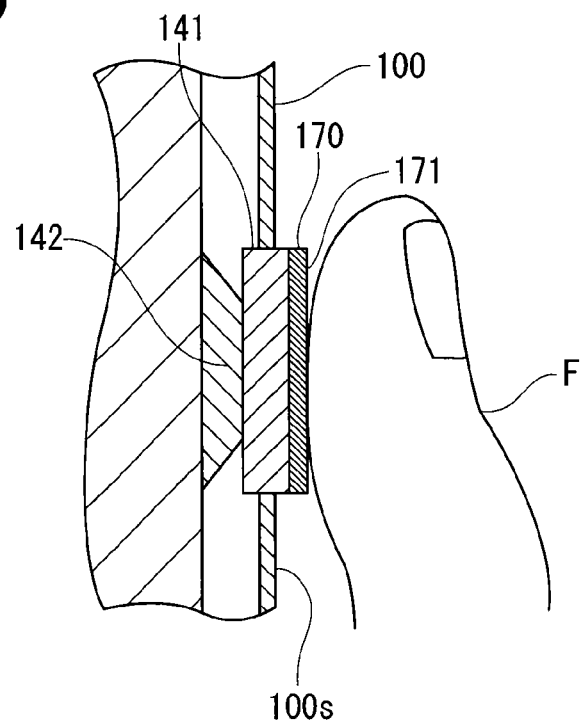
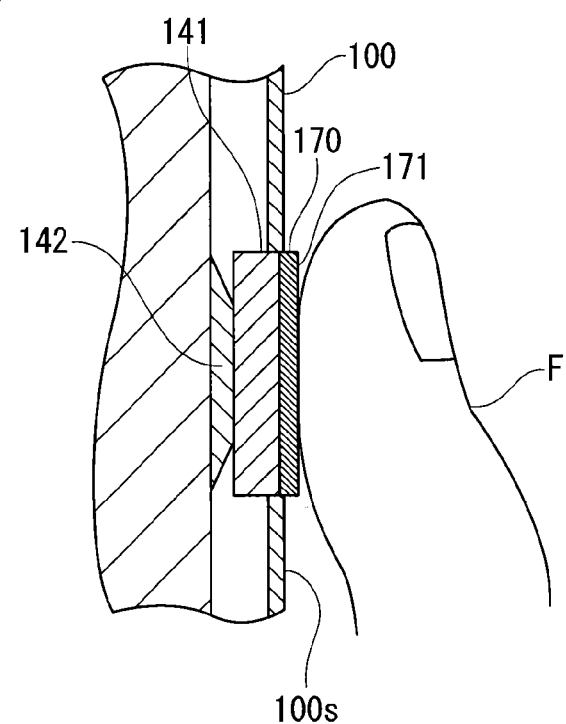

FINGERPRINT AUTHENTICATION

BACKGROUND OF THE INVENTION

Field of the Invention

Devices, systems, and methods for fingerprint authentication are described. In particular, a fingerprint authentication surface is combined with a power switch on an electronic device.

Description of the Related Art

An electronic device, such as a mobile electronic device can include a fingerprint authentication function. Some electronic devices include a fingerprint reading portion and a power button embedded under the fingerprint reading on a side surface of the electronic device. When a user pushes with a finger onto the fingerprint reading portion mounted on the power button, the electronic device recognizes the power button was pushed first. The pattern formed by the linear protrusion on a surface of a fingerprint is subsequently read by the fingerprint reading portion. If the characteristics of the image of the fingerprint are the same as characteristics extracted from a registered fingerprint image, the electronic device will release the lock on functions of the electronic device. When the characteristics of the two images differ, the lock on the functions of the electronic device is not released.

A fingerprint image is read by a touch operation in which a finger touches a detector plane lightly during registration of a fingerprint. When comparing a received fingerprint to the registered fingerprint in a collation (i.e. comparison) process, the finger pushes through the fingerprint reading portion in order to engage a power switch. The fingerprint image is read during this pushing operation by the finger to engage the power switch, which is located on a back or bottom side of the detector plane. Since the pressure to engage the power switch is greater than a touching operation as used for fingerprint identification, the reading of the fingerprint can become distorted. As a result, the electronic device compares the registered fingerprint image with the received fingerprint image which may be distorted and therefore, the received fingerprint may not be considered a match with the registered fingerprint.

SUMMARY OF THE INVENTION

Embodiments include an electronic device comprising an imaging device and a button. The electronic device also includes circuitry configured to acquire a first fingerprint image captured by the imaging device in which the button is not engaged, extract first fingerprint features from the first fingerprint image, and store the first fingerprint features as a registered fingerprint image. The circuitry is also configured to acquire a second fingerprint image captured by the imaging device in which the button is engaged, extract second fingerprint features from the second fingerprint image, and compare the first fingerprint features of the registered fingerprint image and the second fingerprint features extracted from the second fingerprint image. The circuitry is also configured to calculate and store an amount of distortion of the second fingerprint image based on a result of the comparing.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an illustration of a power button embedded under a fingerprint reading portion of an electronic device according to an embodiment;

FIG. 3 is an illustration of a pushing operation on a detector plane of an electronic device according to an embodiment;

Referring now to the drawings, wherein like reference numerals designate identical or corresponding parts throughout the several views.

DETAILED DESCRIPTION OF THE PREFERRED EMBODIMENTS

Embodiments herein describe fingerprint authentication for an electronic device, a method, and a non-transitory computer-readable media. Distortion between a touch fingerprint image for registration purposes and a push fingerprint image for authentication and to engage the power switch is determined. A calculated touch fingerprint image removes the distortion from the push fingerprint image, which can be more accurately compared to the registered touch fingerprint image.

Figure 1:
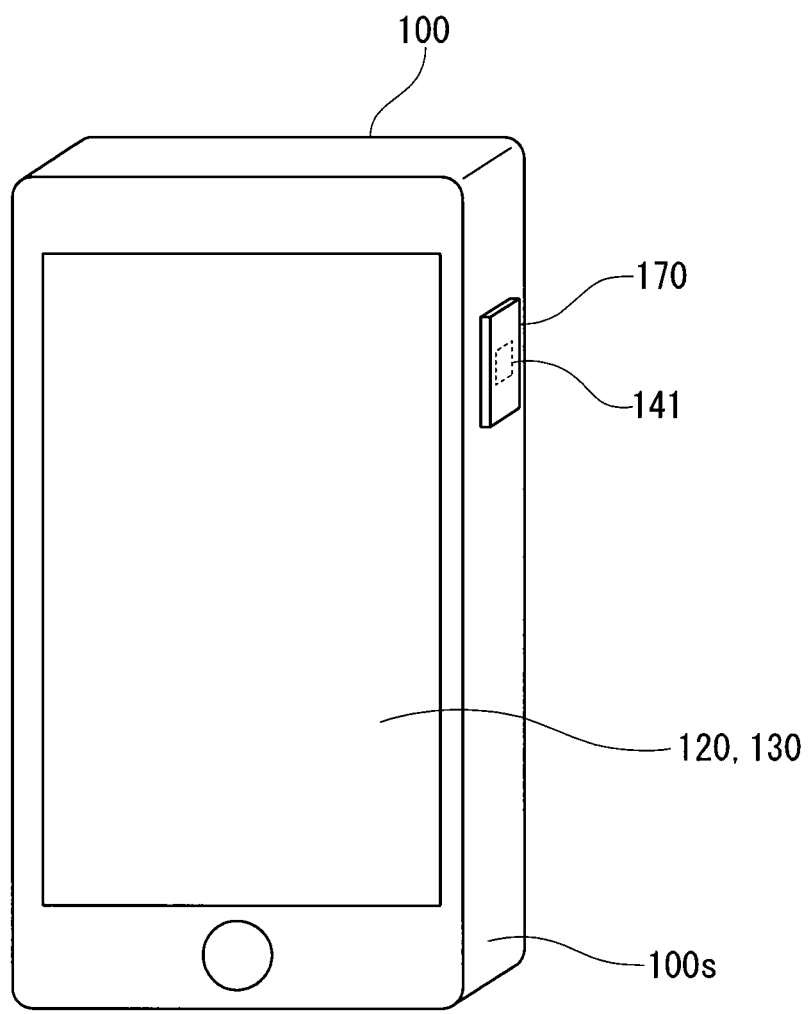
FIG. 1 is a block diagram of an electronic device according to an embodiment.

FIG. 1 is a block diagram of an electronic device 100 illustrating an internal structure of the electronic device 100. A display screen 120 and a touchscreen 130 are arranged on a front side of a case of the electronic device 100. A fingerprint reading portion 170 and a power button 141 are arranged on a side surface 100s of the case.

FIG. 2 is a detailed view, illustrating the power button 141 being embedded under the fingerprint reading portion 170. A detector plane 171 resides on a top surface of the fingerprint reading portion 170. The detector plane 171, the fingerprint reading portion 170, and the power button 141 are arranged at the side surface 100s of the case, such that an axis perpendicular to the side surface 100s passes through each center of the detector plane 171, the fingerprint reading portion 170, and the power button 141. When the fingerprint reading portion 170 is depressed by a finger F, the power button 141 under the fingerprint reading portion 170 will be pressed downward and a power switch 142 will be in an ON state, whereby a power supply is turned on. The fingerprint reading portion 170 mounted on the power button 141 and power switch 142 is used to perform a registration operation and an operation of matching the ridge features and patterns between fingerprint readings.

Finger depression images read by the fingerprint reading portion 170 are divided into a touch operation and a pushing operation. A touch operation is a motion in which finger F touches the detector plane 171 of the fingerprint reading portion 170 on the electronic device 100. The force in which finger F presses the detector plane 171 during a touch operation is weak. In a touch operation, reading of the fingerprint image by the fingerprint reading portion 170 is performed in a state in which the power button 141 and power switch 142 are not pressed down. In an embodiment, the power button 141 can be omitted, whereby the power switch 142 is directly contacted by the fingerprint portion 170 when adequate finger pressure is applied.

Registration of a fingerprint is performed by a touch operation. A touch operation is a simple operation and therefore, fingerprint authentication can be performed multiple times. When registering a fingerprint into the electronic device 100 initially, multiple fingerprint authentications can be performed, such that the characteristics of the fingerprint image read by the touch operations are registered. The power button 141 and power switch 142 are not contacted during a touch operation.

Switch 142 can include a flat type of switch in which a state changes between a pressed switch and a non-pressed switch. Other types of switches 142 include, but are not limited to a shutter on a camera. In a power switch and shutter combination, a contact point can switch between a pressed mode and a non-pressed mode. A pressure sensor or a sound volume operation switch can change the signal output according to a pressure or an operating quantity, respectively.

FIG. 3 illustrates a pushing operation in which finger F presses the detector plane 171 of the fingerprint reading portion 170 at the time of a fingerprint reading. In a pushing operation, the force in which finger F presses the detector plane 171 is stronger than during a touch operation. In a pushing operation, reading of the fingerprint image by the fingerprint reading portion 170 is performed, such that the power button 141 and power switch 142 are pressed down by the fingerprint reading portion 170.

During fingerprint authentication, a user releases the locked state of the electronic device 100 by depressing the power button 141. To begin the fingerprint authentication, the power switch 142 arranged at a lower surface of the power button 141 is pressed down by pressing the fingerprint reading portion 170. Authentication is performed by comparing the characteristics of the registration fingerprint image (first fingerprint image) acquired in the touch operation with the characteristics of the received fingerprint image (second fingerprint image) taken during the pushing operation. In a pushing operation, the pressure applied by the finger F is greater than the pressure applied in a touch operation. Therefore, the received fingerprint image (second fingerprint image) may be distorted, and the ridge features on the received fingerprint image (second fingerprint image) may not necessarily match the ridge features on the registered fingerprint image (first fingerprint image), since the registered fingerprint image was read during a weaker touch operation.

Figure 4:
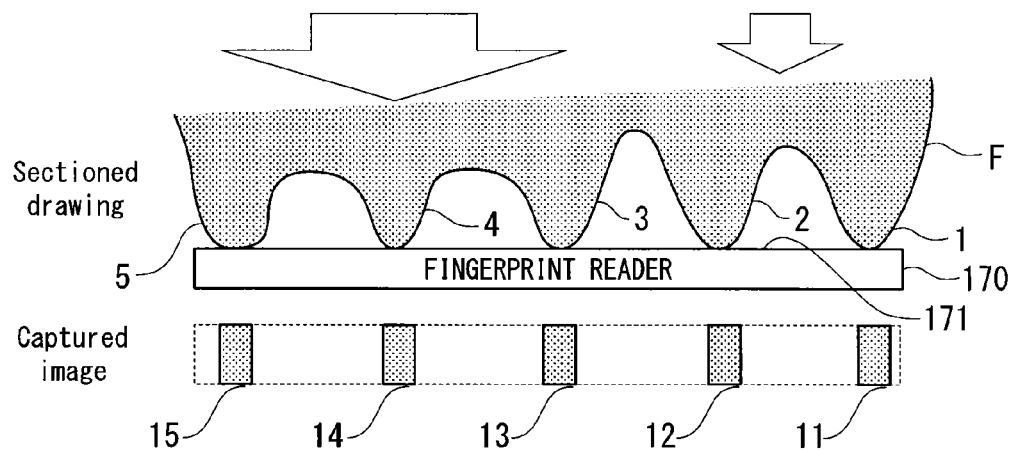
FIG. 4 is a sectional illustration of a fingerprint during a touch operation according to an embodiment.

FIG. 4 is a sectional illustration of a fingerprint during a touch operation, which captures the ridge features and patterns of a fingertip. At the time of reading a fingerprint, ridge protrusions across the finger F contact the detector plane 171. The direction of the arrows in FIG. 4 represents the direction of the forces of finger F. The thickness of the arrows represents a size of the forces. In a touch operation, the forces with respect to finger F are primarily in a perpendicular direction to the detector plane 171. There is a minimal amount of deformation in the ridges 1-5 of finger F. Ridge 5 is at a side closest to the tip of the finger F. The ridges 1-5 of the fingerprint which contact the detector plane 171 are detected by the fingerprint reading portion 170 and are illustrated as images 11-15, respectively.

Figure 5:
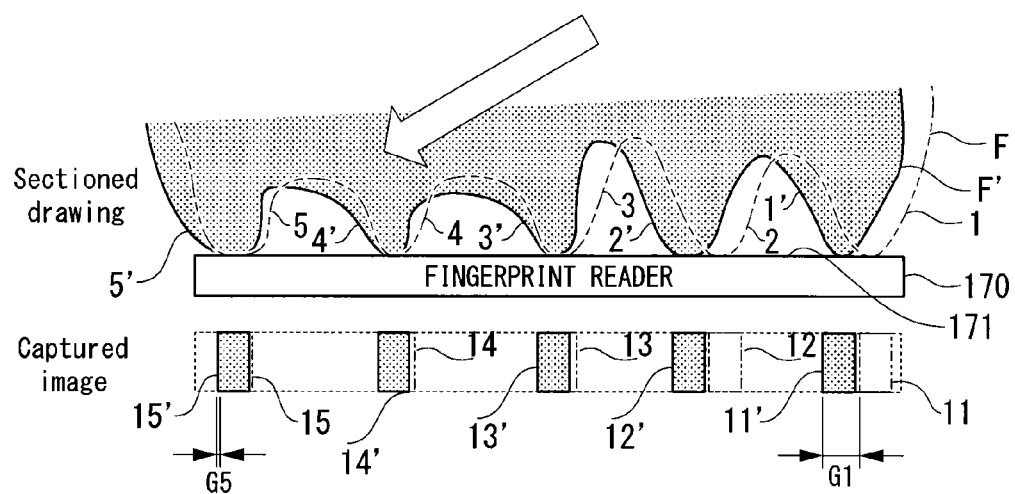
FIG. 5 is a sectional illustration of a fingerprint during a pushing operation according to an embodiment.

FIG. 5 is a sectional illustration of a fingerprint during a pushing operation. FIG. 5 shows an arrow, which illustrates a diagonal force applied by finger F at the detector plane 171. As a result, the ridges 1-5 of finger F deform, and distortion occurs in a fingerprint image. In FIG. 5, a mismatch G1 occurs between image 11 of ridge 1 for finger F during the touch operation and image 11' of ridge 1' by finger F' during the pushing operation, due to distortion of the pushing operation. The mismatch of resulting images for ridges 1'-5' can become large due to the diagonal pushing force of finger F' during the pushing operation.

The pushing force is strongest at a front tip of finger F' and is weakest at an inside of finger F' near the ball of the finger. Stated another way, the pushing force is strongest in a downstream direction towards the tip of finger F' and weakest in an upstream direction towards the inside of the fingertip. In addition, the degree of frictional force closest to ridge 5' at the fingertip of finger F' becomes large and therefore, the mismatch between the touch operation image 15 of ridge 5 and the pushing operation image 15' of ridge 5' is small. The amount of mismatch G5 between the image 15 of ridge 5 during a touch operation and image 15' of ridge 5' during a pushing operation is smaller than the mismatch amount G1 between image 11 of ridge 1 during a touch operation and image 11' of ridge 1' during a pushing operation.

Figure 6:
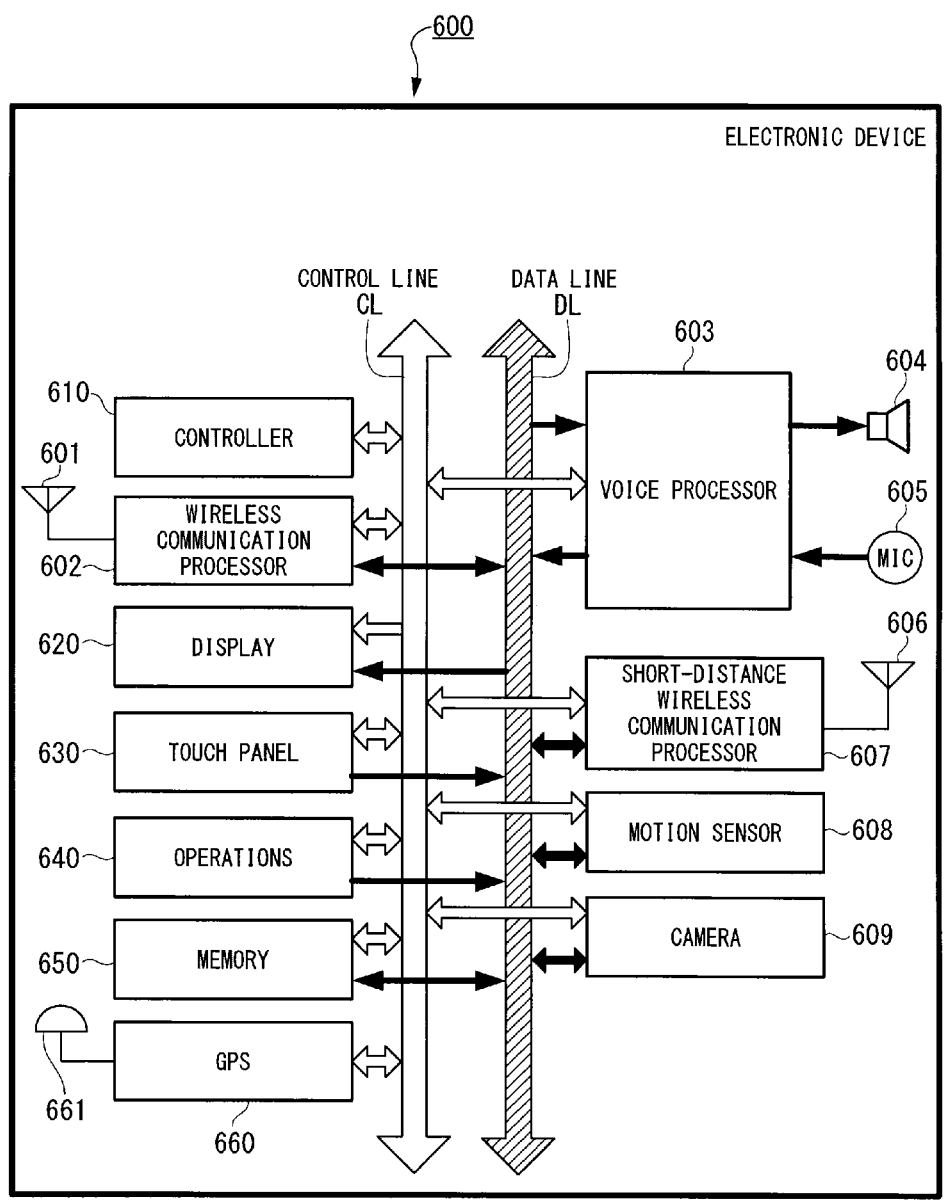
FIG. 6 is a block diagram illustrating an exemplary electronic device according to an embodiment.

FIG. 6 is a block diagram illustrating an exemplary electronic device used in accordance with embodiments of the present disclosure. In the embodiments, electronic device 600 can be a smartphone, a laptop, a tablet, a server, an e-reader, a camera, a navigation device, etc. Electronic device 600 could be used as electronic device 100 and/or electronic device 100A discussed hereinafter. The exemplary electronic device 600 of FIG. 6 includes a controller 610 and a wireless communication processor 602 connected to an antenna 601. A speaker 604 and a microphone 605 are connected to a voice processor 603.

The controller 610 can include one or more Central Processing Units (CPUs), and can control each element in the electronic device 600 to perform functions related to communication control, audio signal processing, control for the audio signal processing, still and moving image processing and control, and other kinds of signal processing. The controller 610 can perform these functions by executing instructions stored in a memory 650. Alternatively or in addition to the local storage of the memory 650, the functions can be executed using instructions stored on an external device accessed on a network or on a non-transitory computer readable medium.

The memory 650 includes but is not limited to Read Only Memory (ROM), Random Access Memory (RAM), or a memory array including a combination of volatile and non-volatile memory units. The memory 650 can be utilized as working memory by the controller 610 while executing the processes and algorithms of the present disclosure. Additionally, the memory 650 can be used for long-term storage, e.g., of image data and information related thereto.

The electronic device 600 includes a control line CL and data line DL as internal communication bus lines. Control data to/from the controller 610 can be transmitted through the control line CL. The data line DL can be used for transmission of voice data, display data, etc.

The antenna 601 transmits/receives electromagnetic wave signals between base stations for performing radio-based communication, such as the various forms of cellular telephone communication. The wireless communication processor 602 controls the communication performed between the electronic device 600 and other external devices via the antenna 601. For example, the wireless communication processor 602 can control communication between base stations for cellular phone communication.

The speaker 604 emits an audio signal corresponding to audio data supplied from the voice processor 603. The microphone 605 detects surrounding audio and converts the detected audio into an audio signal. The audio signal can then be output to the voice processor 603 for further processing. The voice processor 603 demodulates and/or decodes the audio data read from the memory 650 or audio data received by the wireless communication processor 602 and/or a short-distance wireless communication processor 607. Additionally, the voice processor 603 can decode audio signals obtained by the microphone 605.

The exemplary electronic device 600 can also include a display 620, a touch panel 630, an operations key 640, and a short-distance communication processor 607 connected to an antenna 606. The display 620 can be a Liquid Crystal Display (LCD), an organic electroluminescence display panel, or another display screen technology. In addition to displaying still and moving image data, the display 620 can display operational inputs, such as numbers or icons which can be used for control of the electronic device 600. The display 620 can additionally display a GUI for a user to control aspects of the electronic device 600 and/or other devices. Further, the display 620 can display characters and images received by the electronic device 600 and/or stored in the memory 650 or accessed from an external device on a network. For example, the electronic device 600 can access a network such as the Internet and display text and/or images transmitted from a Web server.

The touch panel 630 can include a physical touch panel display screen and a touch panel driver. The touch panel 630 can include one or more touch sensors for detecting an input operation on an operation surface of the touch panel display screen. The touch panel 630 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 630 can detect when the stylus approaches/ contacts the operation surface of the touch panel display (similar to the case in which a finger is used for the touch operation).

According to aspects of the present disclosure, the touch panel 630 can be disposed adjacent to the display 620 (e.g., laminated) or can be formed integrally with the display 620. For simplicity, the present disclosure assumes the touch panel 630 is formed integrally with the display 620 and therefore, examples discussed herein can describe touch operations being performed on the surface of the display 620 rather than the touch panel 630. However, the skilled artisan will appreciate that this is not limiting.

For simplicity, the present disclosure assumes the touch panel 630 is a capacitance-type touch panel technology. However, it should be appreciated that aspects of the present disclosure can easily be applied to other touch panel types (e.g., resistance-type touch panels) with alternate structures. According to aspects of the present disclosure, the touch panel 630 can include transparent electrode touch sensors arranged in the X-Y direction on the surface of transparent sensor glass.

The touch panel driver can be included in the touch panel 630 for control processing related to the touch panel 630, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. Signals can be transmitted by the touch panel driver, e.g. in response to a detection of a touch operation, in response to a query from another element based on timed data exchange, etc.

The touch panel 630 and the display 620 can be surrounded by a protective casing, which can also enclose the other elements included in the electronic device 600. According to aspects of the disclosure, a position of the user's fingers on the protective casing (but not directly on the surface of the display 620) can be detected by the touch panel 630 sensors. Accordingly, the controller 610 can perform display control processing described herein based on the detected position of the user's fingers gripping the casing. For example, an element in an interface can be moved to a new location within the interface (e.g., closer to one or more of the fingers) based on the detected finger position.

Further, according to aspects of the disclosure, the controller 610 can be configured to detect which hand is holding the electronic device 600, based on the detected finger position. For example, the touch panel 630 sensors can detect a plurality of fingers on the left side of the electronic device 600 (e.g., on an edge of the display 620 or on the protective casing), and detect a single finger on the right side of the electronic device 600. In this exemplary scenario, the controller 610 can determine that the user is holding the electronic device 600 with his/her right hand because the detected grip pattern corresponds to an expected pattern when the electronic device 600 is held only with the right hand.

The operation key 640 can include one or more buttons or similar external control elements, which can generate an operation signal based on a detected input by the user. In addition to outputs from the touch panel 630, these operation signals can be supplied to the controller 610 for performing related processing and control. According to aspects of the disclosure, the processing and/or functions associated with external buttons and the like can be performed by the controller 610 in response to an input operation on the touch panel 630 display screen rather than the external button, key, etc. In this way, external buttons on the electronic device 600 can be eliminated in lieu of performing inputs via touch operations, thereby improving water-tightness.

The antenna 606 can transmit/receive electromagnetic wave signals to/from other external apparatuses, and the short-distance wireless communication processor 607 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 607.

The electronic device 600 can include a motion sensor 608. The motion sensor 608 can detect features of motion (i.e., one or more movements) of the electronic device 600. For example, the motion sensor 608 can include an accelerometer to detect acceleration, a gyroscope to detect angular velocity, a geomagnetic sensor to detect direction, a geo-location sensor to detect location, etc., or a combination thereof to detect motion of the electronic device 600. According to aspects of the disclosure, the motion sensor 608 can generate a detection signal that includes data representing the detected motion. For example, the motion sensor 608 can determine a number of distinct movements in a motion (e.g., from start of the series of movements to the stop, within a predetermined time interval, etc.), a number of physical shocks on the electronic device 600 (e.g., a jarring, hitting, etc., of the electronic device 600), a speed and/or acceleration of the motion (instantaneous and/or temporal), or other motion features. The detected motion features can be included in the generated detection signal. The detection signal can be transmitted, e.g., to the controller 610, whereby further processing can be performed based on data included in the detection signal. The motion sensor 608 can work in conjunction with a Global Positioning System (GPS) 660. The GPS 660 detects the present position of the electronic device 600. The information of the present position detected by the GPS 660 is transmitted to the controller 610. An antenna 661 is connected to the GPS 660 for receiving and transmitting signals to and from a GPS satellite.

Electronic device 600 can include a camera 609, which includes a lens and shutter for capturing photographs of the surroundings around the electronic device 600. In an embodiment, the camera 609 captures surroundings of an opposite side of the electronic device 600 from the user. The images of the captured photographs can be displayed on the display panel 620. A memory saves the captured photographs. The memory can reside within the camera 609 or it can be part of the memory 650. The camera 609 can be a separate feature attached to the electronic device 600 or it can be a built-in camera feature.

Figure 7:
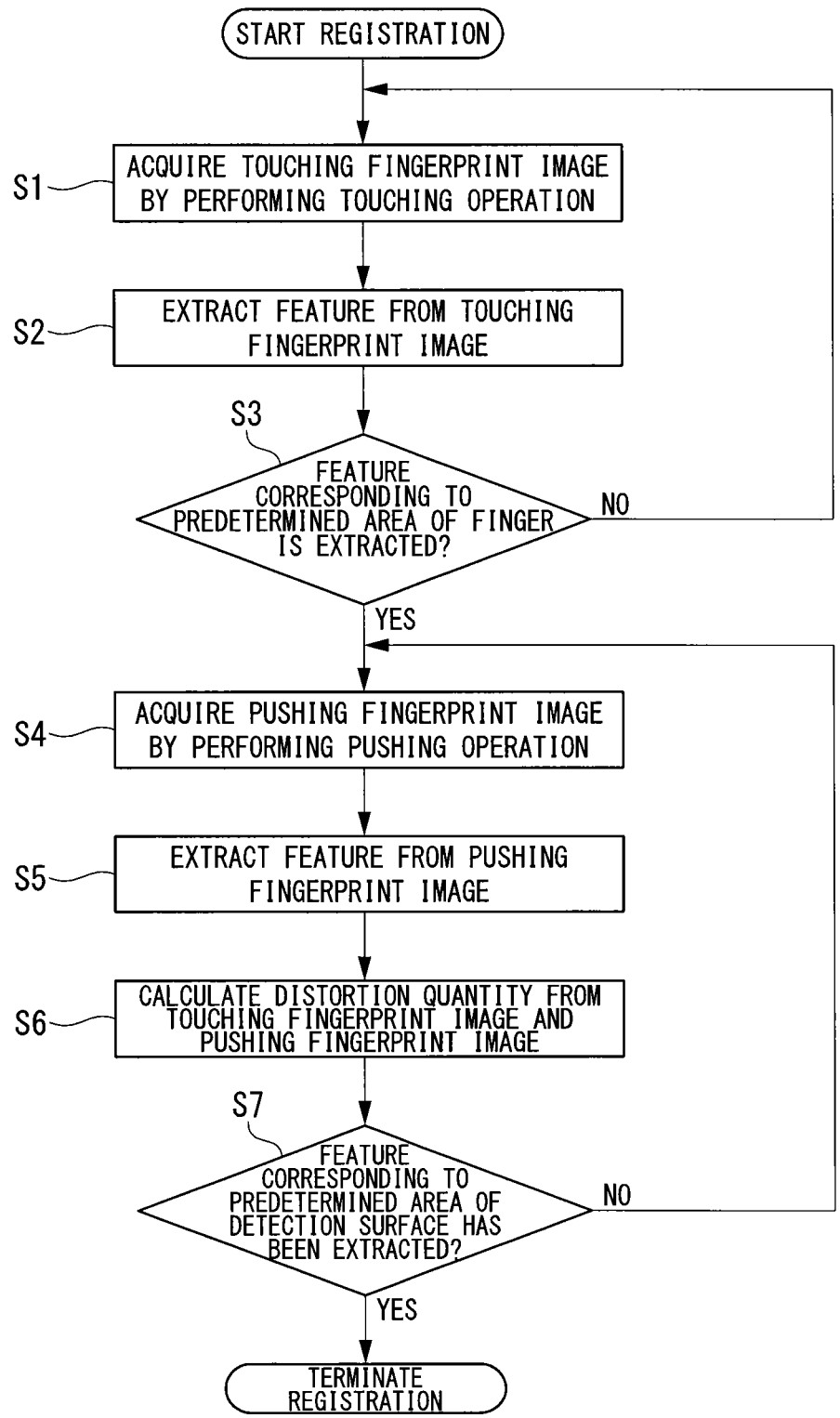
FIG. 7 is an exemplary algorithm illustrating a fingerprint registration process according to an embodiment.

FIG. 7 is an exemplary algorithm illustrating a fingerprint registration process controlled by controller 610 of electronic device 600. The exemplary algorithm of FIG. 7 begins at a time when power is supplied to the electronic device 600 and a fingerprint registration application has started. In step S1, a touch fingerprint image (first fingerprint image) is acquired during a touching operation. The controller 610 of the electronic device 600 reads the fingerprint of the finger placed upon a detector plane, such as detector plane 171 by a touch operation of the fingerprint reading portion 170. The touch fingerprint image (first fingerprint image) is stored in memory 650. Reading of the fingerprint is performed in a state in which the power switch is not pressed, such as power switch 142.

In step S2, controller 610 extracts the characteristics from the touch fingerprint image (first fingerprint image) acquired by the touch operation. In step S3, the controller 610 determines whether the extracted characteristics of the touch fingerprint image (first fingerprint image) were obtained, such as the characteristics corresponding to a predetermined area of a fingertip. If the extracted characteristics of the touch fingerprint image (first fingerprint image) were not obtained (a "no" decision in step S3), the process returns to step S1. If the extracted characteristics of the touch fingerprint image (first fingerprint image) were obtained (a "yes" decision in step S3), the process continues to step S4.

In step S4, the controller 610 reads the fingerprint of the finger placed upon the detector plane 171 during a pushing operation by the fingerprint reading portion 170. The pushing fingerprint image (second fingerprint image) is stored in memory 650. In step S4, a user pushes the fingerprint reading portion 170 with enough force, such that the power switch 142 is also pressed through the fingerprint reading portion 170 when a pushing fingerprint image (second fingerprint image) is acquired.

In step S5, the controller 610 extracts the characteristics from the push fingerprint image (second fingerprint image) acquired by the pushing operation. In step S6, the characteristics of the touch fingerprint image (first fingerprint image) and the characteristics of the push fingerprint image (second fingerprint image) are compared. Controller 610 computes the distortion, i.e. a difference in the two sets of fingerprint characteristics.

In step S7, the controller 610 determines whether the extracted characteristics obtained for the push fingerprint image (second fingerprint image) correspond to a predetermined area of the fingertip on the detector plane 171. If the extracted characteristics of the push fingerprint image (second fingerprint image) were not obtained (a "no" decision in step S7), the process returns to step S4. If the extracted characteristics of the push fingerprint image (second fingerprint image) were obtained (a "yes" decision in step S7), the process terminates.

During a registration operation, the finger F is placed multiple times onto the detector panel 171 of the fingerprint reading portion 170 in a touch operation without pushing the power switch 142 and corresponding power button 141. The controller 610 reads the touch fingerprints and extracts their associated characteristics. In order to obtain a precise record of the size and patterns of fingerprint protrusions, it is necessary to read a large enough area of the fingertip. In addition, the precision is improved with an increased frequency of fingerprint readings.

During a pushing operation, the finger F pushes upon the detector panel 171 with enough force to push through the fingerprint reading portion 170 and depress the power switch 142 and the power button 141. The finger F pushes onto the detector panel 171 multiple times in a pushing operation to obtain protrusion characteristics from the corresponding multiple push fingerprint images. The amount of distortion, i.e. the difference of obtained protrusion characteristics between the touch fingerprint images (first fingerprint images) and the corresponding push fingerprint images (second fingerprint images) is determined.

A user may push upon the detector panel 171 with a varying amount of force throughout repeated push fingerprint readings. Therefore, the amount of calculated distortion between a touch fingerprint image (first fingerprint image) and a push fingerprint image (second fingerprint image) will differ amongst distortion calculations. Therefore, an average value can be calculated across different distortion calculations for the same protrusion points between a touch fingerprint image (first fingerprint image) and a push fingerprint image (second fingerprint image).

In an example given for illustrative purposes only, an average value of a distortion amount can be taken for two out of three different push fingerprint images that were obtained. In another example, when the distortion amount in any one of two push fingerprint images exceeds the predetermined distortion amount, an average value of three distortion amounts can be used. In yet another example, when a second push fingerprint image exceeds the predetermined distortion amount, the second push fingerprint image can be excluded; an average value can be taken using the first and third push fingerprint images instead. A range of predetermined distortion amounts can also be used.

Figure 8:
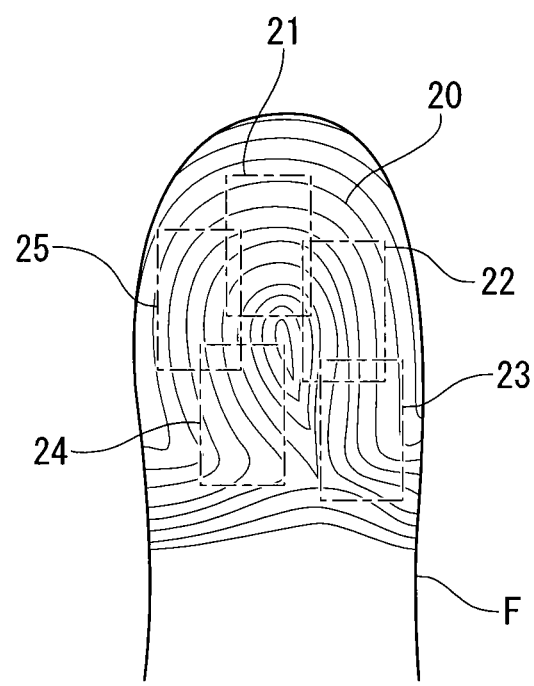
FIG. 8 illustrates different areas of a fingertip acquired during a fingerprint reading according to an embodiment.

FIG. 8 illustrates different areas of a fingertip that are acquired during a fingerprint reading, such as the fingerprint readings obtained in steps S1 through S3 in the algorithm illustrated in FIG. 7. FIG. 8 illustrates five different readings with resulting images 21-25 for fingerprint 20 of finger F. Controller 610 determines whether a total image area obtained from the combined five images, less any overlapping areas, is greater than a predetermined area of a fingertip (from step S3 of FIG. 7). The precision of a fingerprint identification will increase as the combined areas of the images exceeds the predetermined area.

Figure 9:
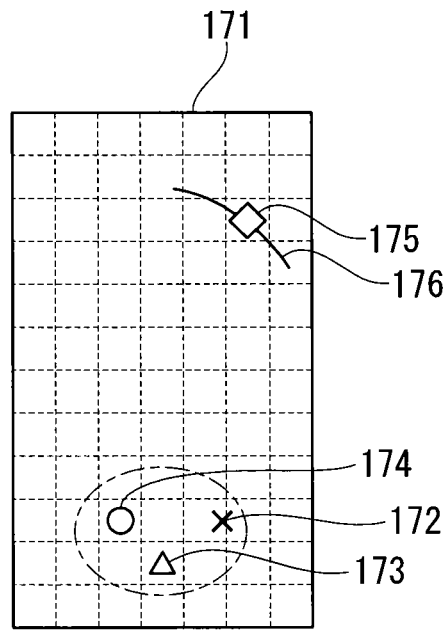
FIG. 9 illustrates feature points of a fingerprint during a touch operation according to an embodiment.

FIG. 9 illustrates positions of various feature points of a fingerprint from a touch fingerprint operation. The minimum components in which the ridge of a fingerprint forms a pattern can include a curved portion, a straight portion, a long portion, and a short portion, for example. Other features can be considered also, such as a terminal point, a branch point, and a junction.

FIG. 9 illustrates an example of a touch operation in which feature points 172-176 of the fingerprint read by the fingerprint reading portion 170 were detected. Feature points from a fingerprint image are managed using a coordinate system of the detector plane 171. Feature points from the fingerprint are matched with coordinates of a sensor device included with the fingerprint reading portion 170. The feature point positions are stored in memory 650. In FIG. 9, feature points 172-174 enclosed by a broken-line are feature points located at a tip of the finger F, in which the feature points 172-174 have a lesser degree of position shift in the pushing operation, as compared to other areas of the fingerprint. As a result, feature points 172-174 can form a reference point of an image during the matching process.

Figure 10:
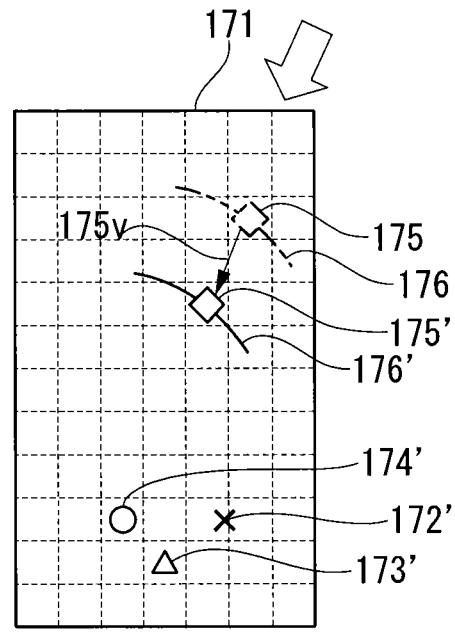
FIG. 10 illustrates distortion of feature points of a fingerprint during a push operation according to an embodiment.

FIG. 10 illustrates positions of various feature points of a fingerprint during a pushing operation. A direction of the arrow illustrated in FIG. 10 is an example of a direction of force made by a finger F during a pushing operation upon the detector plane 171. In the example illustrated in FIG. 10, finger F is placed on the detector plane 171, such that a portion containing feature points 172-174 of the fingerprint during the pushing operation are in the same position of the detector plane 171 as during the touch operation, illustrated in FIG. 9. Therefore, feature points 172' through 174' of the fingerprint during the pushing operation located at the tip of the finger F have a minimum amount of distortion from the feature points 172 to 174 of the fingerprint during the touch operation. However, feature points 175' and 176' closer to the inside ball portion of the fingerprint during the pushing operation have a large deviation from feature points 175-176 during the touch operation.

The distortion of feature points 175 and 176 from a touch operation and feature points 175' and 176' from a pushing operation is acquired and illustrated as vector 175v. At the time of the touch registration operation, a previous mismatch direction of vector 175v and the information of a mismatch amount have been stored in memory 650 as difference information (distortion) between a touch fingerprint image and a push fingerprint image. The amount of distortion for each feature point between a push fingerprint image and a corresponding touch fingerprint image are stored in memory 650 as respective distortion vectors.

Figure 11:
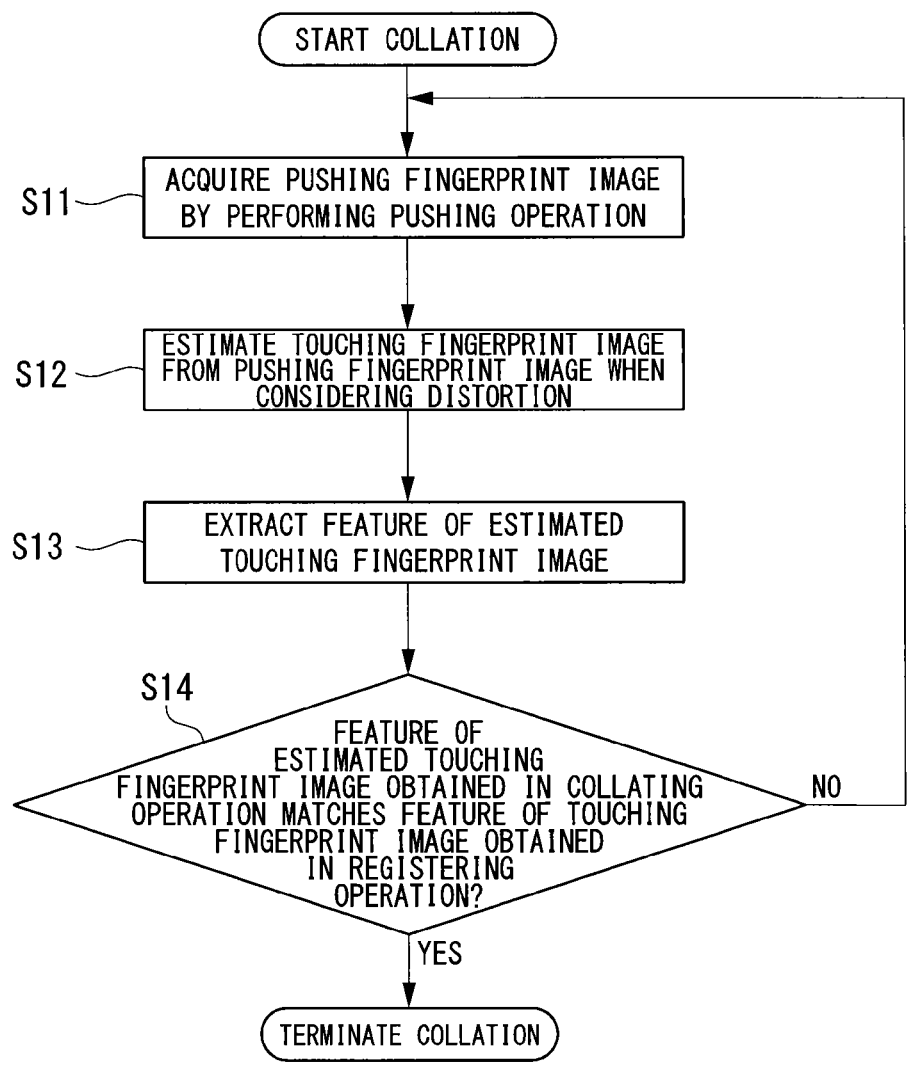
FIG. 11 is an exemplary algorithm illustrating a collation process of fingerprint identification according to an embodiment.

FIG. 11 is an exemplary algorithm illustrating a collation, i.e. comparison process of fingerprint identification by the controller 610 of the electronic device 600, such as electronic device 100. The collation process begins after having pressed down the power switch 142 to begin the fingerprint authentication application. In step S11, controller 610 initiates the fingerprint reading portion 170 when a user presses down the power switch 142 with a finger F through the fingerprint reading portion 170. The finger F is placed on the detector plane 171 when depression of the fingerprint reading portion 170 occurs. The controller 610 reads the fingerprint of the finger F placed on the detector plane 171 in a pushing operation by which the power switch 142 is pressed. The image is stored as a collation fingerprint image in memory 650.

In step S12, controller 610 extracts the characteristics of the push fingerprint image (second fingerprint image) from the pushing operation to obtain the amount of distortion from the touch fingerprint image (first fingerprint image). Controller 610 determines the distorted characteristics from the push fingerprint image (second fingerprint image) back to the registered touch fingerprint image (first fingerprint image) to calculate the amount of distortion. A touch fingerprint image without distortion (third fingerprint image) is therefore calculated from the push fingerprint image (second fingerprint image). In step S13, controller 610 extracts the characteristics of the computed touch fingerprint image (third fingerprint image).

In step S14, controller 610 compares the characteristics of the computed touch fingerprint image (third fingerprint image) with the characteristics of the registered touch fingerprint image (first fingerprint image) stored in memory 650. Controller 650 authenticates the received fingerprint image based upon the collation comparison. When the computed touch fingerprint image (third fingerprint image) does not match the registered touch fingerprint image (first fingerprint image, which is a "no" decision in step S14), the process returns to step S11 to begin the collation process again. For example, the number of congruous features from the computed touch fingerprint image (third fingerprint image) can be compared with the corresponding congruous features of the registered touch fingerprint image (first fingerprint image) to determine whether a match exists. When the number of congruous features is more than a predetermined threshold value, it is determined that the two fingerprint images are in agreement, i.e. match.

In an embodiment, a pattern matching system can determine the correspondence of a pattern between fingerprint images, and a frequency-analysis system can convert a fingerprint image into a frequency collation to determine a corresponding match. Therefore, controller 610 can calculate the resulting (calculated) touch fingerprint image (third fingerprint image) corresponding to a state in which the power switch 142 is not pressed down, based upon a difference between the registered touch fingerprint image (first fingerprint image) and the received push fingerprint image (second fingerprint image). Controller 610 compares the characteristics of the calculated touch fingerprint image (third fingerprint image) with the registered touch fingerprint image (first fingerprint image) to determine if a match exists. When it is determined that a match exists (a "yes" decision in step S14), the collation process terminates.

In an embodiment, controller 610 can determine whether electronic device 600 is held with a right hand or not. In addition, a fingerprint image read by the fingerprint reading portion 170 can determine whether the finger F pressed against the detector plane 171 is that of a right hand or a left hand.

In another embodiment, controller 610 can calculate a push fingerprint image (fourth fingerprint image), which corresponds to a state in which power switch 142 is pressed down during a pushing operation. The calculation can be made from the touch fingerprint image (first fingerprint image) at the time of registration and from a difference between the touch fingerprint image (first fingerprint image) and the push fingerprint image (second fingerprint image). The controller 610 compares characteristics between the push fingerprint image (second fingerprint image) and the calculated push fingerprint image (fourth fingerprint image) to determine a possible match.

The collation process described above for fingerprint matching can be implemented for more than one finger. For example, the fingerprint image of a right thumb and a left index finger of a user can be registered and labeled in memory 650 for later comparison and matching. In addition, controller 610 can determine whether a user is holding the electronic device 100 with a right hand or a left hand, based upon a fingerprint image read by the detector plane 171. A user interface of the fingerprint reading portion 170 can be adjusted accordingly. The controller 610 can determine a display position onto a display screen and output information of the determined display position to a display control element. The display control element can generate image data arranged in a position to match the read fingerprint. In addition, controller 610 can include one or more functions, such as a character string, a moving or still image, a window, or an icon.

Figure 12A:
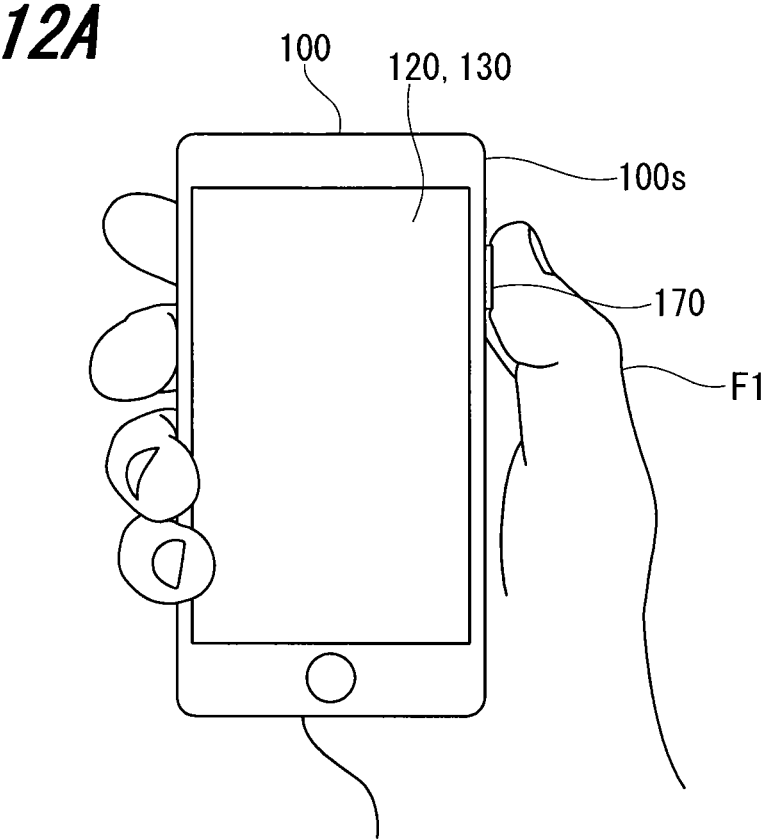
FIG. 12A illustrates a fingerprint reading portion of an electronic device according to an embodiment.
Figure 12B:
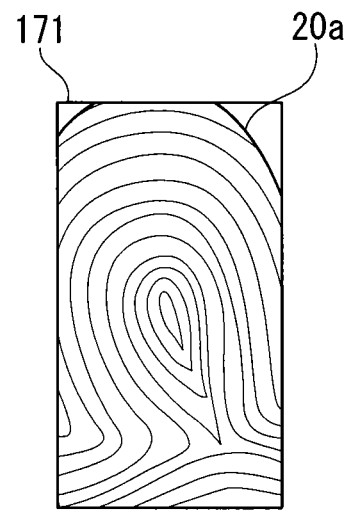
FIG. 12B illustrates a right thumb placed on a detector plane of an electronic device according to an embodiment.

FIG. 12A illustrates electronic device 100 with fingerprint reading portion 170 arranged at an upper portion of a right side of side surface 100s. When a user holds electronic device 100 with the right hand, the fingerprint reading portion 170 reads the fingerprint of a right thumb F1. Fingerprint 20a of thumb F1 placed on detector plane 171 is vertically-arranged within the fingerprint reading portion 170, as illustrated in FIG. 12B.

Figure 13A:
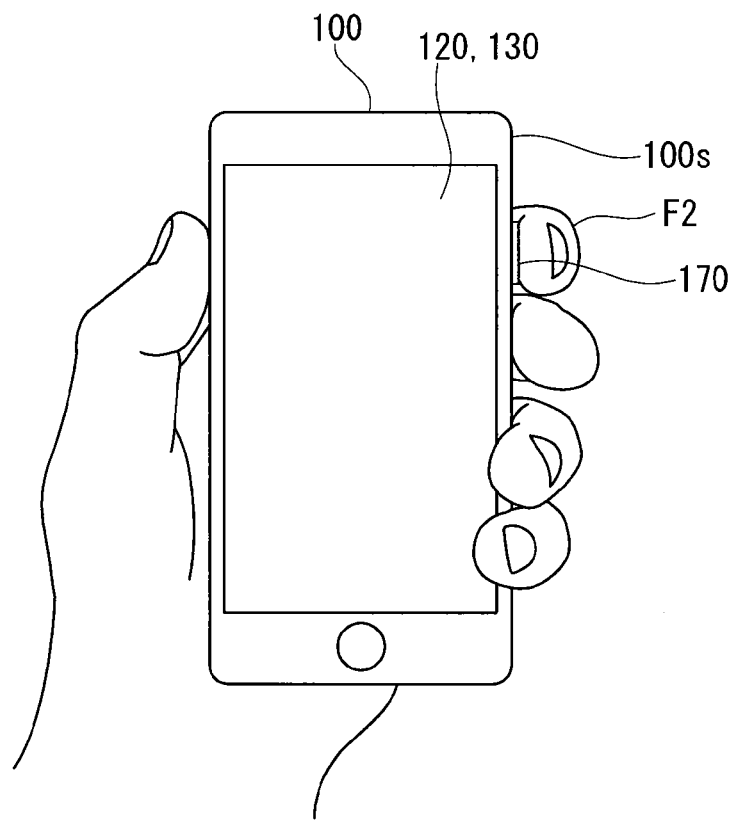
FIG. 13A illustrates a fingerprint reading portion of an electronic device according to an embodiment.
Figure 13B:
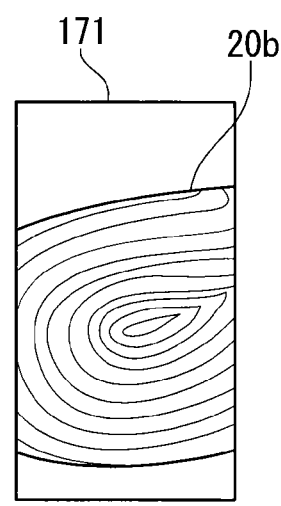
FIG. 13B illustrates a left index finger placed on a detector plane of an electronic device according to an embodiment.

When a user holds electronic device 100 with the left hand as illustrated in FIG. 13A, the fingerprint reading portion 170 reads the fingerprint of the left index finger F2. A fingerprint 20b of the index finger F2 placed on the detector plane 171 is sideways in a diagonally-downward direction within the fingerprint reading portion 170, as illustrated in FIG. 13B.

Figure 14:
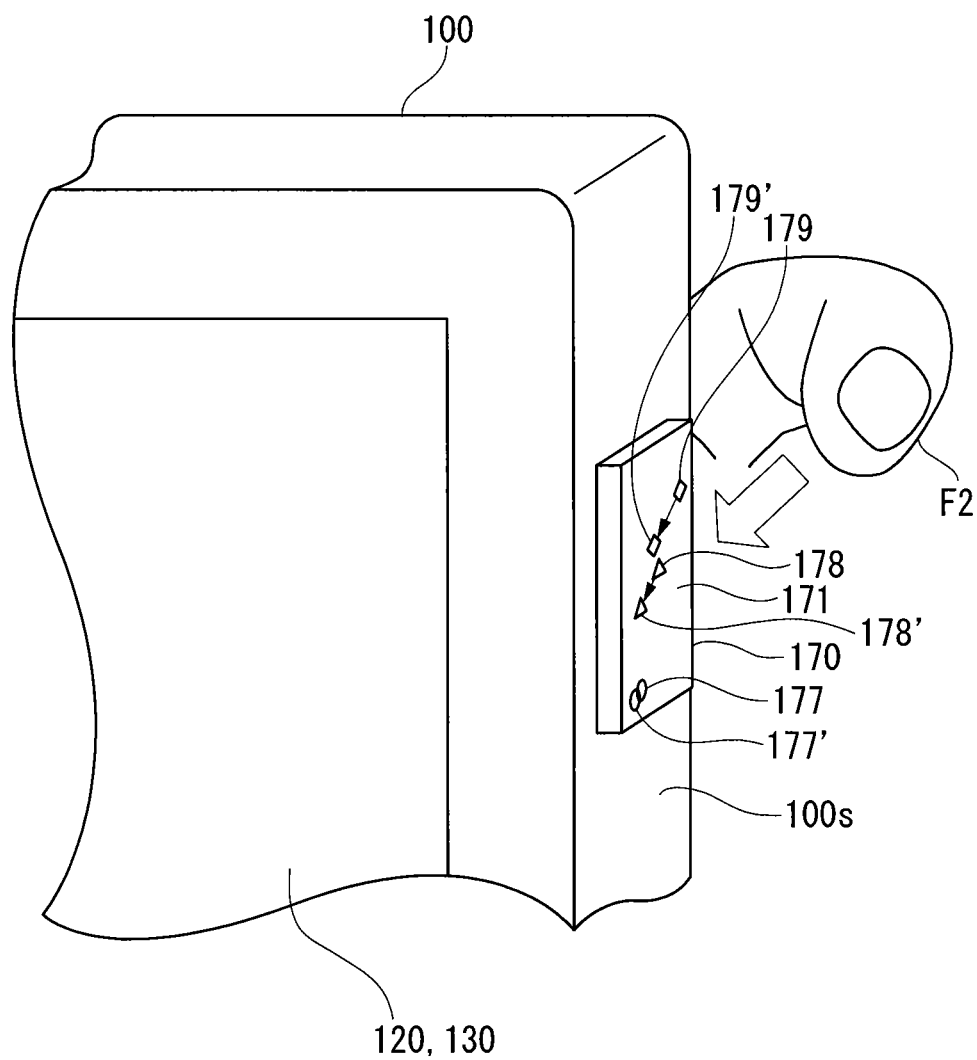
FIG. 14 illustrates a position of a feature point of a fingerprint from a pushing operation according to an embodiment.

Electronic devices, such as electronic device 100 have become enlarged recently. Therefore, when a user stretches the index finger F2 of the left hand towards the detector plane 171 and the power switch 142, distortion of the fingerprint image can also become large. FIG. 14 illustrates a position of a feature point of a fingerprint from a pushing operation. The direction of an illustrated arrow illustrates a direction of force during a pushing operation. The force occurs from an upper direction of the detector plane 171 from index finger F2. The direction of applied force pushes the detector plane 171 in a lower diagonal direction. Feature points 177' through 179' of the fingerprint image from a pushing operation deviate from feature points 177-179 of a registered fingerprint image from a touch operation, causing distortion in the direction of the illustrated arrow and resulting distortion vectors. The amount of distortion is largest away from the tip of the finger near the ball of the finger.

A fingerprint image of a right thumb F1 tends to have a smaller distortion than a fingerprint image of the left index finger F2 during a pushing operation. Therefore, controller 610 may correct a push fingerprint image only when comparing fingerprints of the left index finger F2 and not fingerprints from the right thumb F1, since the amount of distortion may be larger than a predetermined threshold value for the left index finger F2, for example. In addition, a size of the hand as well as a size of the electronic device 100 can affect the amount of distortion between a received push fingerprint image (second fingerprint image) and a registered touch fingerprint image (first fingerprint image).

Figure 15:
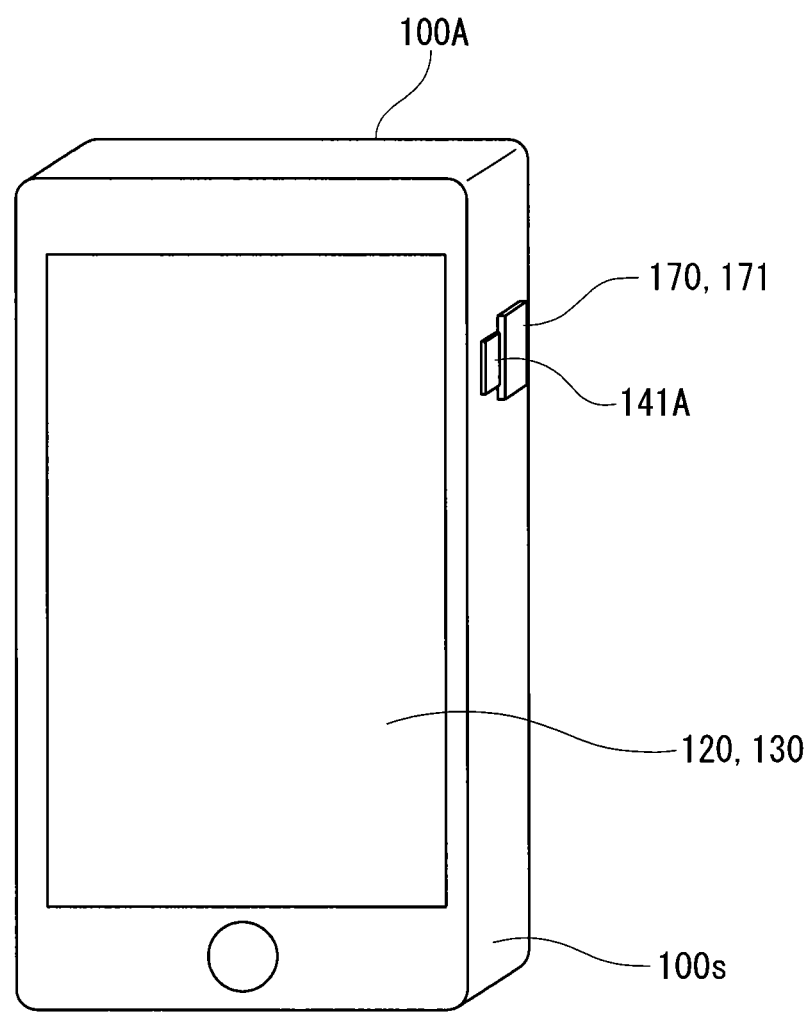
FIG. 15 illustrates an external view of an electronic device according to an embodiment.

FIG. 15 illustrates an external view of an electronic device 100A. A power button 141A is arranged at an upper portion of a side surface 100s next to a fingerprint reading portion 170 and a detector plane 171. The detector plane 171 and power button 141A of the fingerprint reading portion 170 are arranged in the same plane. During operation of the electronic device 100A, a user would press down the power button 141A using a portion of the finger near the fingertip, while a remaining portion of the finger near the ball of the finger would be located on the detector plane 171 of the fingerprint reading portion 170 for right-handed operation of electronic device 100A. For left-handed operation of electronic device 100A, a fingertip of the left index finger would be placed on power switch 141A, and the index finger near the ball of the finger would be placed on the detector plane 171 of the fingerprint reading portion 170.

Embodiments herein describe improvements by which distortion is minimized in a read fingerprint image during a pushing operation, wherein a read fingerprint image taken during a pushing operation also engages a switch and distorts the fingerprint from a previously-recorded touch operation. Methods and systems described herein determine the amount of distortion between a touch fingerprint image and a push fingerprint image and therefrom, provide a calculated touch fingerprint image to compare with the recorded touch fingerprint image. A higher degree of correct matches and a lower degree of incorrect matches result from the methods and systems described herein.

Numerous modifications and variations of the present invention are possible in light of the above teachings. The embodiments described with reference to the drawings may be practiced individually or in any combination thereof. It is therefore to be understood that within the scope of the appended claims, the embodiments may be practiced otherwise than as specifically described herein.

The functions, processes, and algorithms described herein may be performed in hardware or software executed by hardware, including computer processors and/or programmable processing circuits configured to execute program code and/or computer instructions to execute the functions, processes, and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It is noted that, as used in the specification and the appended claims, the singular forms "a," "an," and "the" include plural referents unless the context clearly dictates otherwise.

The above disclosure also encompasses the embodiments noted below.

(1) An electronic device comprising an imaging device and a button. The electronic device also comprises circuitry configured to acquire a first fingerprint image captured by the imaging device in which the button is not engaged, extract first fingerprint features from the first fingerprint image, and store the first fingerprint features as a registered fingerprint image. The circuitry is also configured to acquire a second fingerprint image captured by the imaging device in which the button is engaged, extract second fingerprint features from the second fingerprint image, and compare the first fingerprint features of the registered fingerprint image and the second fingerprint features extracted from the second fingerprint image. The circuitry is also configured to calculate and store an amount of distortion of the second fingerprint image based on a result of the comparing.

(2) The electronic device according to (1), wherein the circuitry is further configured to determine a third fingerprint image for a state in which the button is not engaged from the calculated amount of distortion of the second fingerprint image, and compare the third fingerprint image with the registered fingerprint image.

(3) The electronic device according to any one of (1) through (2), wherein the circuitry is further configured to determine a calculated fingerprint image for a state in which the button is engaged from the registered fingerprint image based upon the amount of distortion between the registered fingerprint image and the second fingerprint image; and compare a received fingerprint image with the calculated fingerprint image in which the button is engaged.

(4) The electronic device according to any one of (1) through (3), wherein the button comprises a power switch.

(5) The electronic device according to any one of (1) through (4), wherein the button is located below a fingerprint reader of the imaging device.

(6) The electronic device according to any one of (1) through (5), wherein the button is located beside a fingerprint reader of the imaging device.

(7) The electronic device according to any one of (1) through (6), wherein the circuitry is further configured to determine whether a contacted area of the imaging device for the first fingerprint image exceeds a predetermined area, and acquire another fingerprint image in which the button is not engaged when the contacted area does not exceed the predetermined area.

(8) The electronic device according to any one of (1) through (7), wherein the predetermined area comprises a plurality of fingerprint images.

(9) The electronic device according to any one of (1) through (8), wherein a sum of non-overlapping areas of the plurality of fingerprint images exceeds the predetermined area.

(10) The electronic device according to any one of (1) through (9), wherein the circuitry is further configured to determine whether a contacted area of the imaging device for the second fingerprint image exceeds a predetermined area, and acquire another fingerprint image in which the button is engaged when the contacted area does not exceed the predetermined area.

(11) The electronic device according to any one of (1) through (10), wherein the circuitry is further configured to determine a direction of force applied to the imaging device from the second fingerprint image in which the button is engaged.

(12) The electronic device according to any one of (1) through (11), wherein the circuitry is further configured to determine whether a thumb or an index finger is pressing against a detector plane of the imaging device.

(13) The electronic device according to any one of (1) through (12), wherein the circuitry is further configured to unlock features of the electronic device when a match is determined from the comparing.

(14) The electronic device according to any one of (1) through (13), wherein the circuitry is further configured to communicate results of the comparing to an external device.

(15) A method of authenticating a fingerprint of an electronic device, the method comprising capturing a first fingerprint image via an imaging device, wherein a power button is positioned underneath or next to a detector plane of the imaging device. The method also includes extracting fingerprint features from the first fingerprint image in which the power button is not engaged, and saving the extracted fingerprint features of the first fingerprint image in which the power button is not engaged as a registered fingerprint image. The method also includes extracting fingerprint features from a second fingerprint image on the detector plane in which the power button is engaged, determining an amount of distortion between the registered fingerprint image and the second fingerprint image, and saving the determined amount of distortion between the registered fingerprint image and the second fingerprint image. The method also includes acquiring a third fingerprint image in which the power button is engaged, removing the amount of distortion from the third fingerprint image, and comparing the third fingerprint image after the removing with the registered fingerprint image to determine a match.

(16) A non-transitory computer-readable storage medium having computer-readable instructions embodied thereon, that when executed by a computing device, executes a method comprising capturing a first fingerprint image via an imaging device, wherein a power button is positioned underneath or next to a detector plane of the imaging device. The method also includes extracting fingerprint features from the first fingerprint image in which the power button is not engaged, and saving the extracted fingerprint features of the first fingerprint image in which the power button is not engaged as a registered fingerprint image. The method also includes extracting fingerprint features from a second fingerprint image on the detector plane in which the power button is engaged, determining an amount of distortion between the registered fingerprint image and the second fingerprint image, and saving the determined amount of distortion between the registered fingerprint image and the second fingerprint image. The method also includes acquiring a third fingerprint image in which the power button is engaged, removing the amount of distortion from the third fingerprint image, and comparing the third fingerprint image after the removing with the registered fingerprint image to determine a match.

The invention claimed is:

1. An electronic device, comprising:
   an imaging device;
   a button; and
   circuitry configured to
   acquire a first fingerprint image captured by the imaging device in which the button is not engaged;
   extract first fingerprint features from the first fingerprint image;
   store the first fingerprint features as a registered fingerprint image;
   acquire a second fingerprint image captured by the imaging device in which the button is engaged;
   extract second fingerprint features from the second fingerprint image;
   compare the first fingerprint features of the registered fingerprint image and the second fingerprint features extracted from the second fingerprint image; and
   calculate and store an amount of distortion of the second fingerprint image based on a result of the comparing.

2. The electronic device of claim 1, wherein the circuitry is further configured to
   determine a third fingerprint image for a state in which the button is not engaged from the calculated amount of distortion of the second fingerprint image; and
   compare the third fingerprint image with the registered fingerprint image.

3. The electronic device of claim 2, wherein the circuitry is further configured to
   determine a calculated fingerprint image for a state in which the button is engaged from the registered fingerprint image based upon the amount of distortion between the registered fingerprint image and the second fingerprint image; and
   compare a received fingerprint image with the calculated fingerprint image in which the button is engaged.

4. The electronic device of claim 1, wherein the button comprises a power switch.

5. The electronic device of claim 1, wherein the button is located below a fingerprint reader of the imaging device.

6. The electronic device of claim 1, wherein the button is located beside a fingerprint reader of the imaging device.

7. The electronic device of claim 1, wherein the circuitry is further configured to
   determine whether a contacted area of the imaging device for the first fingerprint image exceeds a predetermined area; and
   acquire another fingerprint image in which the button is not engaged when the contacted area does not exceed the predetermined area.

8. The electronic device of claim 7, wherein the predetermined area comprises a plurality of fingerprint images.

9. The electronic device of claim 8, wherein a sum of non-overlapping areas of the plurality of fingerprint images exceeds the predetermined area.

10. The electronic device of claim 1, wherein the circuitry is further configured to
    determine whether a contacted area of the imaging device for the second fingerprint image exceeds a predetermined area; and
    acquire another fingerprint image in which the button is engaged when the contacted area does not exceed the predetermined area.

11. The electronic device of claim 1, wherein the circuitry is further configured to
    determine a direction of force applied to the imaging device from the second fingerprint image in which the button is engaged.

12. The electronic device of claim 11, wherein the circuitry is further configured to
    determine whether a thumb or an index finger is pressing against a detector plane of the imaging device.

13. The electronic device of claim 1, wherein the circuitry is further configured to
    unlock features of the electronic device when a match is determined from the comparing.

14. The electronic device of claim 1, wherein the circuitry is further configured to
    communicate results of the comparing to an external device.

15. A method of authenticating a fingerprint of an electronic device, the method comprising:
    capturing a first fingerprint image via an imaging device, wherein a power button is positioned underneath or next to a detector plane of the imaging device;
    extracting fingerprint features from the first fingerprint image in which the power button is not engaged;
    saving the extracted fingerprint features of the first fingerprint image in which the power button is not engaged as a registered fingerprint image;
    extracting fingerprint features from a second fingerprint image on the detector plane in which the power button is engaged;
    determining an amount of distortion between the registered fingerprint image and the second fingerprint image;
    saving the determined amount of distortion between the registered fingerprint image and the second fingerprint image;
    acquiring a third fingerprint image in which the power button is engaged;
    removing the amount of distortion from the third fingerprint image; and
    comparing the third fingerprint image after the removing with the registered fingerprint image to determine a match.

16. A non-transitory computer-readable storage medium having computer-readable instructions embodied thereon, that when executed by a computing device, executes a method comprising:
    capturing a first fingerprint image via an imaging device, wherein a power button is positioned underneath or next to a detector plane of the imaging device;

extracting fingerprint features from the first fingerprint image in which the power button is not engaged;

saving the extracted fingerprint features of the first fingerprint image in which the power button is not engaged as a registered fingerprint image;

extracting fingerprint features from a second fingerprint image on the detector plane in which the power button is engaged;

determining an amount of distortion between the registered fingerprint image and the second fingerprint image;

saving the determined amount of distortion between the registered fingerprint image and the second fingerprint image;

acquiring a third fingerprint image in which the power button is engaged;

removing the amount of distortion from the third fingerprint image; and comparing the third fingerprint image after the removing with the registered fingerprint image to determine a match.

* * * * *